US012459271B2

(12) United States Patent
Nakayama et al.

(10) Patent No.: US 12,459,271 B2
(45) Date of Patent: Nov. 4, 2025

(54) LIQUID DISCHARGE APPARATUS, SUBSTRATE PROCESSING APPARATUS AND ARTICLE MANUFACTURING METHOD

(71) Applicant: CANON KABUSHIKI KAISHA, Tokyo (JP)

(72) Inventors: Shugo Nakayama, Tokyo (JP); Tomofumi Nishikawara, Tochigi (JP); Akiko Iimura, Tochigi (JP); Masahiro Kuri, Tochigi (JP); Tetsuya Yamamoto, Tochigi (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 125 days.

(21) Appl. No.: 18/468,010

(22) Filed: Sep. 15, 2023

(65) Prior Publication Data

US 2024/0100853 A1 Mar. 28, 2024

(30) Foreign Application Priority Data

Sep. 27, 2022 (JP) ................................ 2022-153999

(51) Int. Cl.
*B41J 2/18* (2006.01)
*B41J 2/045* (2006.01)
*B41J 2/145* (2006.01)

(52) U.S. Cl.
CPC ............ *B41J 2/18* (2013.01); *B41J 2/04505* (2013.01); *B41J 2/145* (2013.01)

(58) Field of Classification Search
None
See application file for complete search history.

(56) References Cited

FOREIGN PATENT DOCUMENTS

| | | | | | |
|---|---|---|---|---|---|
| JP | 2018206777 A | | 12/2018 | | |
| JP | 2020192692 A | | 12/2020 | | |
| JP | 2021012815 A | | 2/2021 | | |
| JP | 2023059579 | * | 4/2023 | ................ | B41J 2/01 |
| JP | 2023059579 A | * | 4/2023 | | |
| KR | 20230133762 | * | 9/2023 | .............. | B41J 2/275 |
| KR | 20230133762 A | * | 9/2023 | .............. | B41J 2/175 |

* cited by examiner

*Primary Examiner* — Kristal Feggins
(74) *Attorney, Agent, or Firm* — ROSSI, KIMMS & McDOWELL LLP

(57) ABSTRACT

A liquid discharge apparatus including a head configured to discharge a liquid, a chamber configured to contain the head, a circulation system configured to circulate a gas inside the chamber, an exhaust system configured to operate to exhaust the gas to an outside of the chamber, a filter provided in the circulation system and configured to remove a removal target contained in the gas, a detection unit configured to indirectly detect the removal target by detecting a detection target that is contained in the gas and different from the removal target, and a controller configured to operate the exhaust system when a concentration of the detection target detected by the detection unit is not lower than a threshold.

24 Claims, 9 Drawing Sheets

LIQUID DISCHARGE APPARATUS, SUBSTRATE PROCESSING APPARATUS AND ARTICLE MANUFACTURING METHOD

BACKGROUND OF THE INVENTION

Field of the Invention

The present invention relates to a liquid discharge apparatus, a substrate processing apparatus and an article manufacturing method.

Description of the Related Art

Forming a pattern (patterning) by applying the material of a function element onto a substrate using an inkjet apparatus (liquid discharge apparatus) when manufacturing various function elements has recently been tried. Patterning using an inkjet apparatus has advantages such as that the use efficiency of a material is high because on-demand patterning is possible, the manufacturing apparatus is relatively small because it is a non-vacuum process, and a material can be quickly applied in a large area thereby.

Japanese Patent Laid-Open No. 2021-12815 proposes that an inkjet apparatus be applied to the manufacturing process of a display device. Recently, various display methods have been proposed for display devices, and display devices using an organic EL element are being developed particularly. The material of the organic EL element is expensive, so an inkjet apparatus that has high material use efficiency and can quickly apply a material in a large area is suitable for manufacturing the organic EL element.

These days, a display device including a color converter containing a quantum dot material and quantum dots as a light-emitting element has received attention. For example, Japanese Patent Laid-Open No. 2020-192692 proposes a technique of manufacturing a color converter containing a quantum dot material using an inkjet apparatus. A color converter using a conventional color filter cuts light of wavelengths except a specific wavelength, thereby extracting the specific color. Instead of the conventional color filter, quantum dots can be used for the color converter to directly convert the light wavelength, and implementation of very high light conversion efficiency is expected.

Known examples of the major component of quantum dots are cadmium, indium, and lead. These heavy metal substances are substances (toxic substances) toxic to the human body, and it is necessary to prevent exposure of the human body to these substances. Considering application of a quantum dot material using the inkjet apparatus, mist-like small droplets, called a mist, containing the quantum dot material scatter owing to inkjet characteristics, and a strict exposure measure is required.

As an exposure measure in the inkjet apparatus, Japanese Patent Laid-Open No. 2018-206777 proposes a technique of isolating (partitioning) an inkjet apparatus by a barrier called a chamber and air-tightly closing air inside the chamber. Japanese Patent Laid-Open No. 2018-206777 also proposes a technique of circulating air inside the chamber by a blower (air fan) and arranging a filter (filter configured to remove the quantum dot material and the like) on the circulation path to decontaminate the air inside the chamber, in order to always keep the inside of the chamber clean.

However, the removal performance of the filter generally deteriorates due to aged deterioration. If the deterioration cannot be detected and the apparatus is kept in operation, the inside of the chamber may be filled with the mist and the apparatus contaminated. Considering that an inkjet apparatus is used to apply the quantum dot material, a detection device capable of detecting the quantum dot material is not generally distributed. A detection device capable of detecting the quantum dot material may be manufactured independently, but the research and development costs and the like rise, resulting in a high apparatus cost. It is impractical and very difficult to detect apparatus contamination caused by mist containing quantum dots scattering inside the chamber.

SUMMARY OF THE INVENTION

The present invention provides a liquid discharge apparatus advantageous for suppressing apparatus contamination arising from a liquid discharged from a head.

According to one aspect of the present invention, there is provided a liquid discharge apparatus including a head configured to discharge a liquid, a chamber configured to contain the head, a circulation system configured to circulate a gas inside the chamber, an exhaust system configured to operate to exhaust the gas to an outside of the chamber, a filter provided in the circulation system and configured to remove a removal target contained in the gas, a detection unit configured to indirectly detect the removal target by detecting a detection target that is contained in the gas and different from the removal target, and a controller configured to operate the exhaust system when a concentration of the detection target detected by the detection unit is not lower than a threshold.

Further aspects of the present invention will become apparent from the following description of exemplary embodiments with reference to the attached drawings.

DESCRIPTION OF THE EMBODIMENTS

Figure 1:
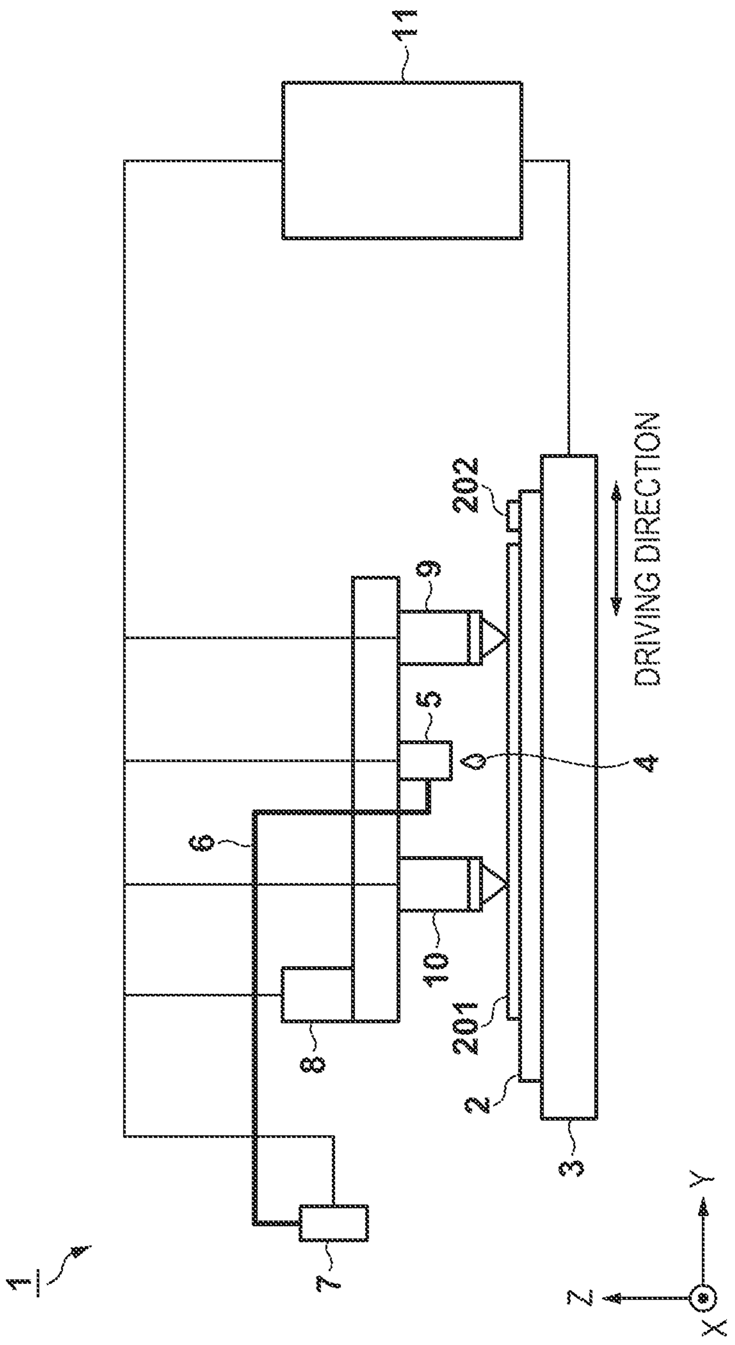
FIG. 1 is a schematic view illustrating configurations of a liquid discharge apparatus according to an aspect of the present invention.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

FIG. 1 is a schematic view illustrating configurations of a liquid discharge apparatus 1 according to an aspect of the present invention. The liquid discharge apparatus 1 is embodied as, for example, an inkjet apparatus that discharges a liquid (discharge liquid) such as ink. The liquid discharge apparatus 1 also has the function of a substrate processing apparatus that processes a display panel or a semiconductor substrate. In the embodiment, the liquid discharge apparatus 1 discharges a liquid to a substrate to form the pattern or film of the liquid on the substrate. Note that in the embodiment, "ink" means a liquid used to form a pattern or a film on a substrate. Although the ink component is not particularly limited, for example, a liquid containing a solute and a solvent for forming an organic film can be used.

In this specification and accompanying drawings, a direction is represented by an XYZ coordinate system in which a direction parallel to a discharge direction in which the liquid discharge apparatus 1 discharges a discharge liquid is defined as the Z-axis, and two directions along a plane perpendicular to the Z-axis and perpendicular to each other are defined as the X- and Y-axes. Directions parallel to the X-, Y-, and Z-axes in the XYZ coordinate system are defined as the X, Y, and Z directions, respectively, and a plane parallel to a plane in which a substrate is arranged is defined as an X-Y plane.

The liquid discharge apparatus 1 includes a substrate stage 3 that holds (fixes) and drives a substrate 2 such as a display panel. The substrate 2 is properly selected from a glass substrate, a plastic substrate, and the like in accordance with a target product manufactured as an article. The substrate 2 is typically a plate-like member, but is not limited to a specific form as long as a member functions as a substrate. For example, the substrate 2 may be a deformable film or a circular substrate. The substrate 2 includes an element area 201 to which an ink 4 is supplied from the liquid discharge apparatus 1 to form (array) many function elements (display pixels), and an evaluation area 202 to which the ink 4 is experimentally discharged to evaluate the state of the ink 4 discharged from the liquid discharge apparatus 1.

The liquid discharge apparatus 1 includes discharge heads 5 that discharge (droplets of) the ink 4 to a predetermined position on the substrate 2, an ink supply system 6 that supplies the ink 4 to the discharge heads 5, and an ink tank 7 that stores the ink 4. The liquid discharge apparatus 1 also includes a recovery unit 8 that recovers the discharge characteristic of the discharge heads 5 by performing cleaning processing or the like on (nozzles of) the discharge heads 5, and a controller 11.

The discharge heads 5 include a plurality of nozzles (discharge elements) for discharging (droplets of) the ink 4. A plurality of discharge heads 5 are arrayed in, for example, the X and Y directions, respectively. Discharge of the ink 4 can be individually controlled for each discharge head 5 to arrange (apply) the ink 4 in a target distribution in the element area 201 on the substrate.

When the substrate 2 is held on the substrate stage 3, a placement error of the substrate 2 (position deviation of the substrate 2 with respect to the substrate stage 3) may occur. Through various manufacturing processes of the substrate 2, the substrate 2 may distort in the X and Y directions. Thus, the liquid discharge apparatus 1 includes an alignment scope 9 for measuring the position of the substrate 2 and distortion of the substrate 2.

The substrate 2 held by the substrate stage 3 varies in thickness in manufacturing. When the ink 4 is discharged from the discharge head 5 while the substrate stage 3 is driven (scanned) in the Y direction, landing positions of (droplets of) the ink 4 with respect to the substrate 2 vary owing to variations of the thickness of the substrate 2. Considering this, the liquid discharge apparatus 1 includes a height sensor 10 that measures a position (height) of the substrate 2 in the Z direction.

The controller 11 is constituted by, for example, a computer (information processing apparatus) including a CPU, a memory, and the like. The controller 11 comprehensively controls the respective units of the liquid discharge apparatus 1 to operate the liquid discharge apparatus 1 in accordance with a program stored in the memory.

Figure 2:
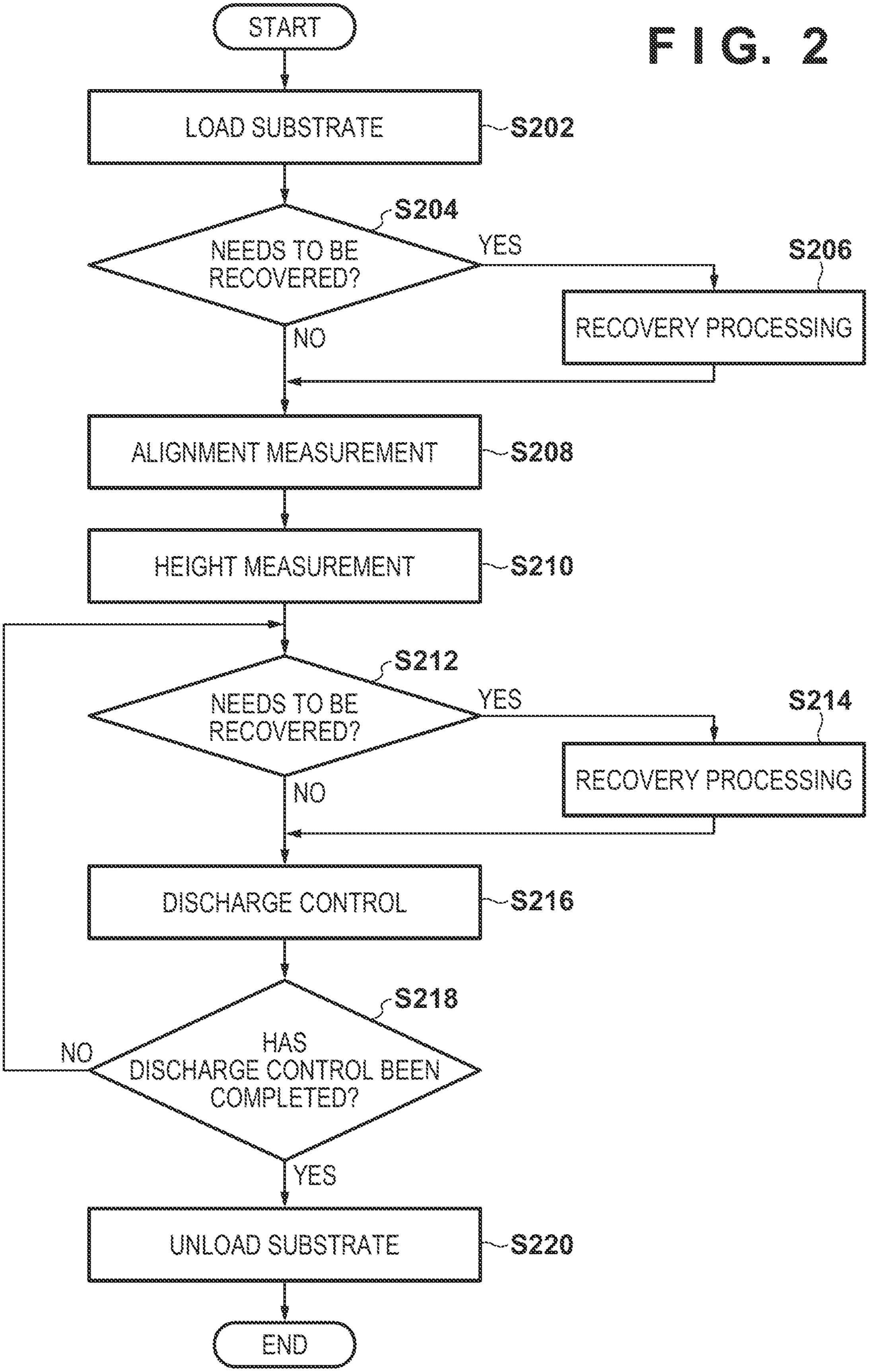
FIG. 2 is a flowchart for explaining the operation sequence of the liquid discharge apparatus.

The operation sequence of the liquid discharge apparatus 1 will be explained with reference to FIG. 2. As described above, this operation is performed by comprehensively controlling the respective units of the liquid discharge apparatus 1 by the controller 11.

In step S202, the controller 11 loads the substrate 2 into the liquid discharge apparatus 1 via a substrate conveyance mechanism (not shown). The substrate 2 loaded into the liquid discharge apparatus 1 is held by the substrate stage 3.

In step S204, the controller 11 determines whether the discharge characteristic of the discharge head 5 needs to be recovered, that is, performs recovery determination of the discharge head 5. The recovery determination of the discharge head 5 is performed basically before the ink 4 is discharged from the discharge head 5. If the controller 11 determines that the discharge characteristic of the discharge head 5 needs to be recovered (YES), it shifts to step S206. If the controller 11 determines that the discharge characteristic of the discharge head 5 need not be recovered (NO), it shifts to step S208.

In step S206, the controller 11 performs recovery processing (for example, cleaning processing on the discharge head 5) to recover the discharge characteristic of the discharge head 5 via the recovery unit 8.

In step S208, the controller 11 performs alignment measurement of the substrate 2 via the substrate stage 3 and the alignment scope 9. In step S210, the controller 11 performs height measurement of the substrate 2 via the substrate stage 3 and the height sensor 10. Substrate information about the position, distortion, and height of the substrate 2 obtained by the alignment measurement in step S208 and the height measurement in step S210 is stored in, for example, (the memory of) the controller 11. The controller 11 generates discharge control information for controlling the discharge head 5 (discharge of the ink 4), based on the substrate information obtained by the alignment measurement in step S208 and the height measurement in step S210, and element data including information such as an element array formed on the substrate 2, the size of an element, and the like. The discharge control information includes information representing the target distribution of the ink 4 in the element area 201 and evaluation area 202 of the substrate 2.

Note that the order of the alignment measurement in step S208 and the height measurement in step S210 may be reversed. The alignment measurement in step S208 and the height measurement in step S210 can be performed in parallel with the recovery processing in step S206. The embodiment assumes that the substrate stage 3 is driven within the X-Y plane with respect to the alignment scope 9 and the height sensor 10 in the alignment measurement and the height measurement. However, it is also possible to fix the substrate stage 3 and drive the alignment scope 9 and the height sensor 10 within the X-Y plane.

In step S212, the controller 11 determines whether the discharge characteristic of the discharge head 5 needs to be recovered, that is, performs recovery determination of the discharge head 5. If the controller 11 determines that the discharge characteristic of the discharge head 5 needs to be recovered (YES), it shifts to step S214. If the controller 11 determines that the discharge characteristic of the discharge head 5 need not be recovered (NO), it shifts to step S216.

In step S214, similar to step S206, the controller 11 performs recovery processing (for example, cleaning processing on the discharge head 5) to recover the discharge characteristic of the discharge head 5 via the recovery unit 8.

In step S216, the controller 11 performs discharge control of the discharge head 5. More specifically, the controller 11 controls discharge of (droplets of) the ink 4 from the discharge head 5 based on discharge control information while synchronously driving the substrate stage 3 and the discharge head 5. The embodiment assumes that the substrate stage 3 is driven within the X-Y plane with respect to the discharge head 5 in the discharge control of the discharge head 5. However, it is also possible to fix the substrate stage 3 and drive the discharge head 5 within the X-Y plane.

Figure 3:
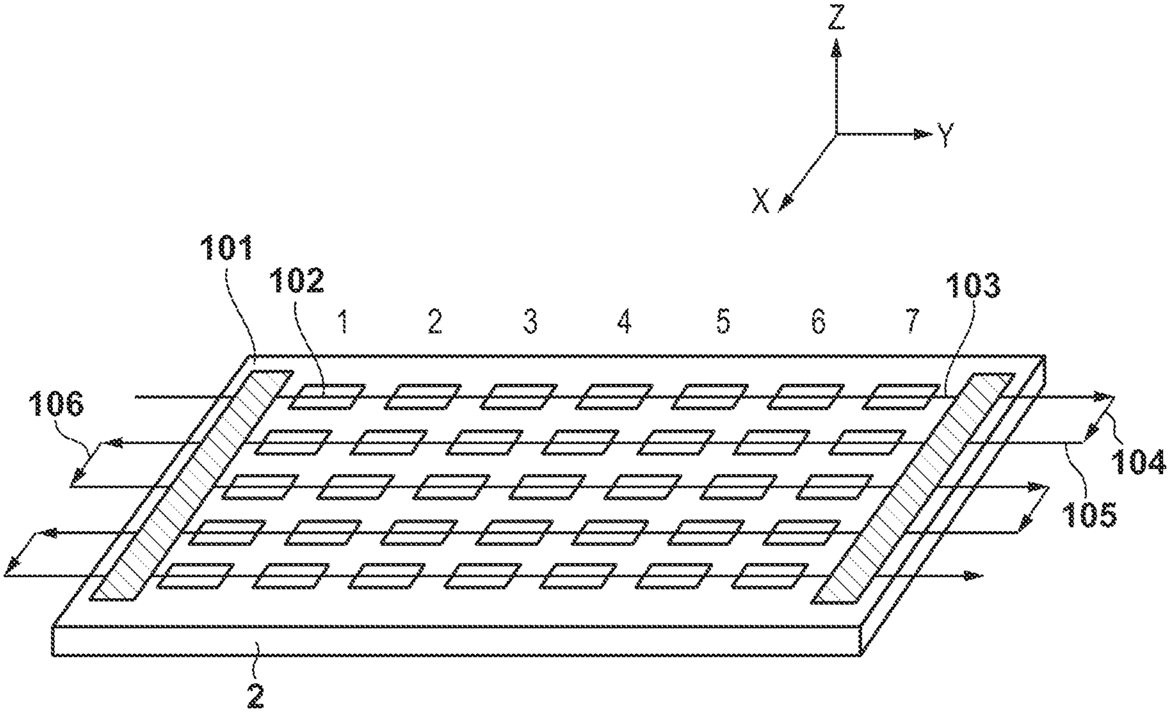
FIG. 3 is a view schematically illustrating a substrate on which the material of function elements is arranged.

In the embodiment, to form many function elements on a substrate, the substrate 2 and the discharge head 5 are relatively scanned, and the material of the function elements is discharged as the ink 4 from the discharge head 5 to arrange (apply) the material of the function elements in the element area 201 of the substrate 2. FIG. 3 is a view schematically illustrating the substrate 2 on which the material of function elements is arranged. In FIG. 3, a substrate surface 101 is a surface of the element area 201 on which function elements 102 are formed, out of the surface of the substrate 2. Arrows 103, 104, 105, and 106 indicate relative scanning directions of the substrate 2 and discharge head 5, respectively. In FIG. 3, 7×5 function elements 102 are formed on the substrate. In practice, an enormous number of function elements are formed.

In step S218, the controller 11 determines whether the discharge control of the discharge head 5 has been completed. If the controller 11 determines that the discharge control of the discharge head 5 has not been completed (NO), it shifts to step S212. If the controller 11 determines that the discharge control of the discharge head 5 has been completed (YES), it shifts to step S220.

In step S220, the controller 11 unloads the substrate 2 from the liquid discharge apparatus 1 via the substrate conveyance mechanism (not shown).

Considering a case where the function element 102 formed on the substrate is a color converter containing a quantum dot material, the ink 4 discharged from the discharge head 5 contains a quantum dot material. Since the quantum dot material contains a heavy metal substance such as cadmium, indium, or lead, exposure of the human body to the quantum dot material needs to be prevented. In the liquid discharge apparatus 1, when the ink 4 is discharged from the discharge head 5, mist-like small droplets, called a mist, containing the quantum dot material scatter from the ink 4, and thus a strict exposure measure is taken, which will be described in the following embodiments.

First Embodiment

Figure 4:
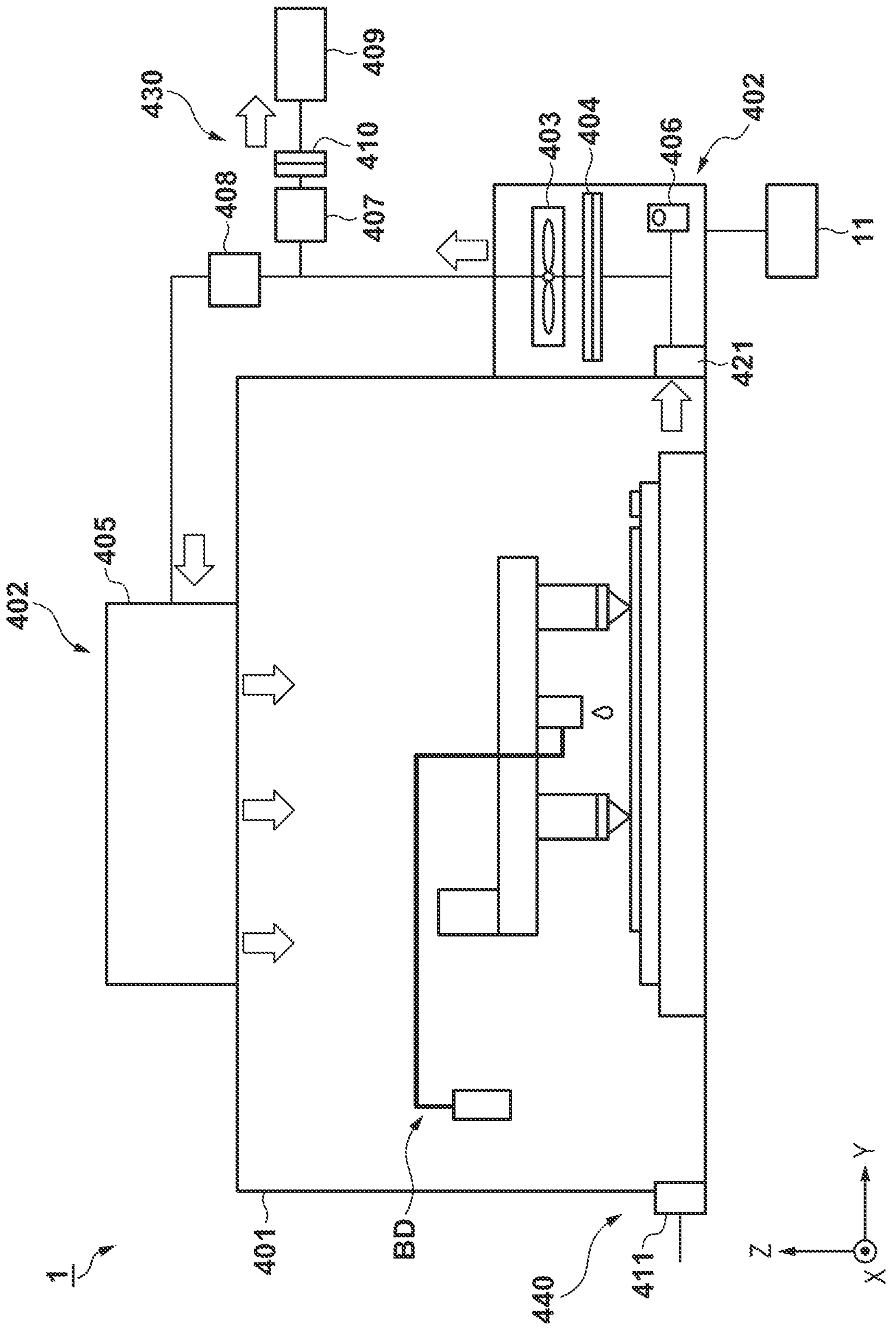
FIG. 4 is a view illustrating configurations of a liquid discharge apparatus according to a first embodiment.

FIG. 4 is a view illustrating configurations of a liquid discharge apparatus 1 according to a first embodiment. In the embodiment, as shown in FIG. 4, the liquid discharge apparatus 1 includes a chamber 401 containing a main body DB including a substrate stage 3, a discharge head 5, an ink supply system 6, an ink tank 7, a recovery unit 8, an alignment scope 9, and a height sensor 10. The chamber 401 is a barrier for isolating the main body DB (at least the vicinity of the discharge head 5). The chamber 401 airtightly closes a gas (air) inside the chamber 401, and prevents leakage, to the outside of the chamber 401, of a quantum dot material contained in a mist scattering from the ink 4. The quantum dot material contained in the mist scattering from the ink 4 will be referred to as a removal target.

As shown in FIG. 4, the liquid discharge apparatus 1 includes a circulation system 402 that circulates a gas inside the chamber 401. The circulation system 402 includes, for example, a blower (air fan) 403 and a flow straightener 405. The circulation system 402 also includes a filter 404 that removes the mist of the ink 4 scattering inside the chamber 401, particularly, a removal target contained in a gas inside the chamber 401.

The gas inside the chamber 401 is drawn by the blower 403 into the circulation system 402 via an exhaust port 421 provided in the chamber 401, and passes through the filter 404. The gas from which the removal target has been removed as the gas passes through the filter 404 is straightened by the flow straightener 405, and returned to the inside of the chamber 401. The flow straightener 405 that returns the gas to the inside of the chamber 401 is preferably provided at the upper portion of the chamber 401. This is because the removal target containing the quantum dot material and the like is generally heavier in specific gravity than air serving as the gas inside the chamber 401. The removal efficiency of the removal target can be improved by flowing the gas inside the chamber 401 from top to bottom. For a similar reason, the exhaust port 421 for drawing air inside the chamber 401 into the circulation system 402 is preferably provided at the lower portion of the chamber 401.

By circulating the gas inside the chamber 401 via the circulation system 402 including the filter 404, the filter 404 can remove the removal target contained in the gas owing to the mist scattering from the ink 4 discharged from the discharge head 5. Hence, the gas inside the chamber 401 can be kept clean.

To keep clean the gas inside the chamber 401, the state of the gas (gas circulated by the circulation system 402) inside the chamber 401 needs to be monitored while the liquid discharge apparatus 1 operates. For example, the removal performance of the filter 404 with respect to a removal target deteriorates due to aged deterioration. Even so, if the apparatus is kept operated, the inside of the chamber 401 is filled with the mist, that is, the removal target scattering from the ink 4, and the apparatus may be contaminated. Since a detection device (sensor) capable of detecting the removal target contained in the mist scattering from the ink 4 is not generally distributed. It is difficult to directly detect the removal target contained in the gas inside the chamber 401.

To solve this, as shown in FIG. 4, the liquid discharge apparatus 1 includes a detection unit 406 capable of detecting an organic component (detection target different from the removal target) contained in the gas inside the chamber 401. The mist scattering from the ink 4 discharged from the discharge head 5 contains the organic component in addition to the removal target. In other words, when the ink 4 is discharged from the discharge head 5, the organic component scatters inside the chamber 401 together with (correlatively with) the removal target scattering from the ink 4 inside the chamber 401. If the inside of the chamber 401 is filled with the mist owing to aged deterioration of the filter 404 or the like, the concentration of the organic component rises in conjunction with the concentration of the removal target contained in the gas inside the chamber 401. The detection unit 406 detects the concentration of the organic component contained in the gas inside the chamber 401, and the concentration of the removal target contained in the gas inside the chamber 401 can be detected indirectly. The detection unit 406 cannot directly detect the concentration of the removal target contained in the gas inside the chamber 401, but can be assumed to pseudo-detect the concentration of the removal target.

The liquid discharge apparatus 1 includes, as an exhaust system 430 that operates to exhaust the gas inside the chamber 401 to the outside of the chamber 401, a first selector valve 407, a second selector valve 408, and exhaust equipment 409. In the embodiment, when the concentration of the organic component detected by the detection unit 406 is equal to or higher than a threshold, the controller 11 operates the exhaust system 430. More specifically, when the concentration of the organic component detected by the detection unit 406 reaches the threshold, the controller 11 opens the first selector valve 407 and closes the second selector valve 408, thereby exhausting air inside the chamber 401 to the exhaust equipment 409. Note that, as shown in FIG. 4, a filter 410 that removes the mist of the ink 4, particularly, the removal target is preferably provided on the preceding stage of the exhaust equipment 409 so as to remove the removal target contained in the gas exhausted to the exhaust equipment 409.

The liquid discharge apparatus 1 also includes an air supply system 440 that operates to suck a gas (air) outside the chamber 401 into the chamber 401 via an air supply port 411 provided at the lower portion of the chamber 401. In the embodiment, the air supply system 440 forms, by the gas sucked into the chamber 401 via the air supply port 411, an airflow that sweeps away the gas inside the chamber 401 toward the exhaust port 421.

When operating the exhaust system 430, the controller 11 also operates the air supply system 440. For example, the controller 11 operates the exhaust system 430 and the air supply system 440 so that the flow rate (exhaust amount) of a gas exhausted to the outside of the chamber 401 by the exhaust system 430 and the flow rate (suction amount) of a gas sucked into the chamber 401 by the air supply system 440 become equal to each other. Accordingly, the pressure (internal pressure) inside the chamber 401 can be kept constant.

In the embodiment, when exhausting a gas inside the chamber 401 to the outside of the chamber 401, the first selector valve 407 is opened and the second selector valve 408 is closed. Thus, all the gas circulated by the circulation system 402 can be exhausted to maximize the exhaust effect (cleaning efficiency of the gas inside the chamber 401) by the exhaust system 430. However, a certain effect can be obtained even by opening both the first selector valve 407 and the second selector valve 408, and exhausting part of the gas circulated by the circulation system 402 when exhausting the gas inside the chamber 401 to the outside of the chamber 401.

In the embodiment, the arrangement positions of the blower 403, filter 404, flow straightener 405, detection unit 406, first selector valve 407, and second selector valve 408 shown in FIG. 1 are merely an example, and can be changed as long as the above-described effects can be obtained. The types of the filters 404 and 410 are not limited, and generally include an organic filter, an inorganic filter, an HEPA filter, and the like.

As described above, according to the embodiment, the exhaust system 430 is operated in accordance with the concentration of the organic component contained in the gas inside the chamber 401. The embodiment is advantageous for suppressing apparatus contamination arising from the ink 4 discharged from the discharge head 5. In particular, the embodiment is very useful for suppressing the inside of the chamber 401 being filled with the removal target such as the quantum dot material contained in the mist of the ink 4, and preventing exposure of the human body to the removal target.

Second Embodiment

Figure 5:
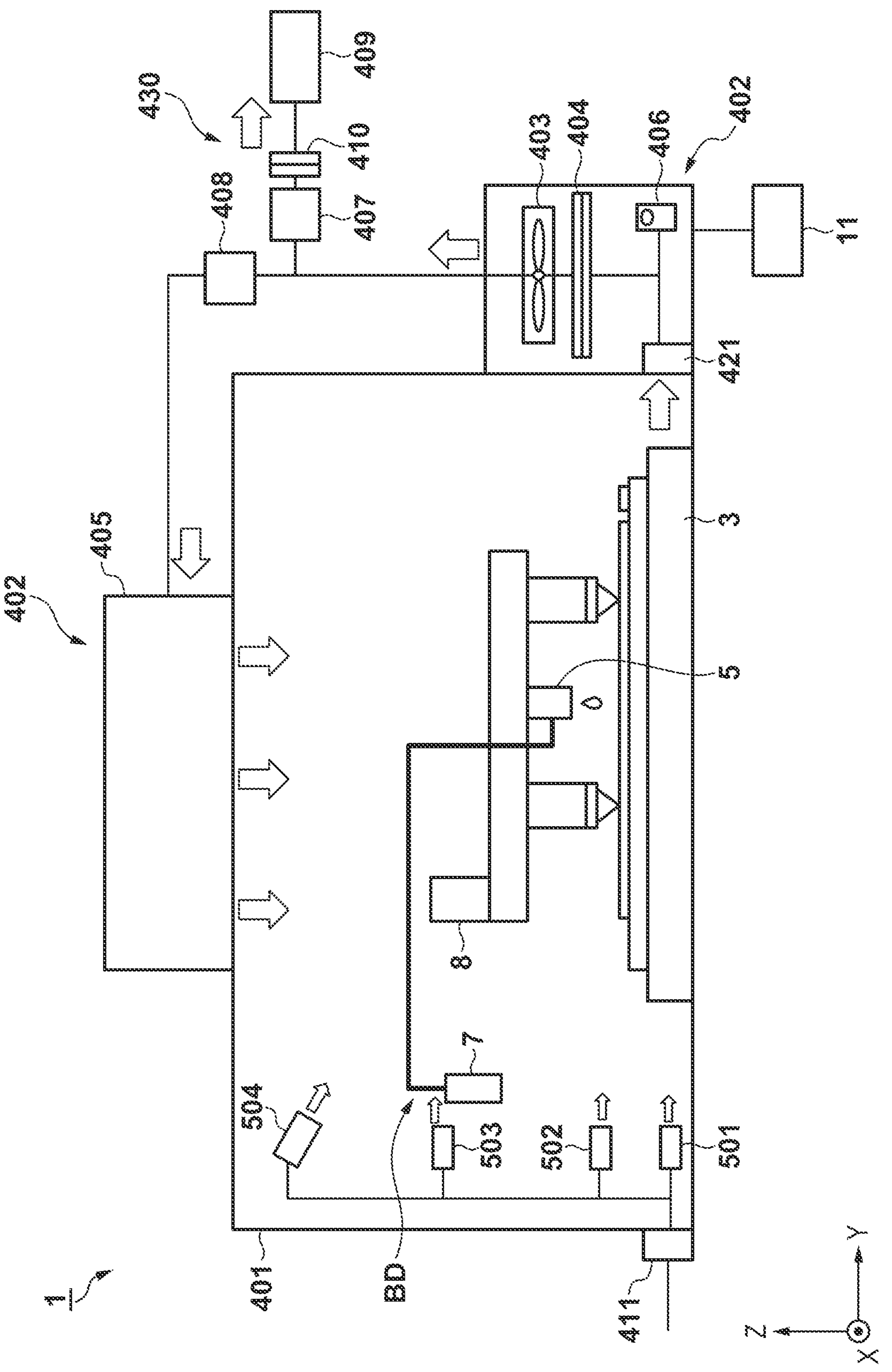
FIG. 5 is a view illustrating configurations of a liquid discharge apparatus according to a second embodiment.

FIG. 5 is a view illustrating configurations of a liquid discharge apparatus 1 according to a second embodiment. In the embodiment, as shown in FIG. 5, the liquid discharge apparatus 1 includes a plurality of airflow generators 501, 502, 503, and 504 (a plurality of nozzles) that blow out, to the inside of a chamber 401, a gas (gas outside the chamber 401) sucked via an air supply port 411. The airflow generators 501 to 504 are respectively branched from the air supply port 411, and have a function of generating an airflow using (the flow of) a gas sucked into the chamber 401 via the air supply port 411. In the embodiment, the airflow generators 501 to 504 form an airflow that sweeps away a gas inside the chamber 401 toward an exhaust port 421 by the gas sucked into the chamber 401 via the air supply port 411. Each of the airflow generators 501 to 504 includes, for example, an air blow nozzle as a mechanism that generates an airflow. To generate a more active airflow, each of the airflow generators 501 to 504 may further include a blower for increasing the flow velocity of a gas blown out to the inside of the chamber 401.

The airflow generator 501 is provided to generate an airflow that sweeps away a gas near the bottom surface of the chamber 401 and flows toward the exhaust port 421 communicating with a circulation system 402 and an exhaust system 430. This is because a removal target containing a quantum dot material and the like is generally heavier in specific gravity than air serving as a gas inside the chamber 401 and stays in the direction of gravity, as described above. The removal efficiency of the removal target can be improved by sweeping away, toward the exhaust port 421 by the airflow generated by the airflow generator 501, the removal target staying at the bottom surface of the chamber 401.

In the embodiment, the risk of apparatus contamination by a mist (removal target such as the quantum dot material) scattering inside the chamber 401 from an ink 4 discharged from a discharge head 5 is high in a space between the discharge head 5 and the substrate stage 3. Therefore, the airflow generator 502 that generates an airflow is provided toward the space between the discharge head 5 and the substrate stage 3. The airflow generator 502 is provided so that an airflow generated by the airflow generator 502 passes through the space between the discharge head 5 and the substrate stage 3 and flows toward the exhaust port 421 communicating with the circulation system 402 and the exhaust system 430.

A large amount of ink 4 (liquid containing the removal target such as the quantum dot material) is stored in an ink tank 7. When an abnormality occurs in the ink tank 7, abrupt apparatus contamination is highly likely to occur. Considering this, the airflow generator 503 is so provided as to generate an airflow that sweeps away a gas in the peripheral region of the ink tank 7 and flows toward the exhaust port 421 communicating with the circulation system 402 and the exhaust system 430. Even if an abnormality occurs in the ink tank 7, generation of abrupt apparatus contamination near the ink tank 7 can be suppressed.

A large amount of ink 4 (liquid containing the removal target such as the quantum dot material) recovered from the discharge head 5 when recovering the discharge characteristic of the discharge head 5 is stored in a recovery unit 8, similar to the ink tank 7. When an abnormality occurs in the recovery unit 8, abrupt apparatus contamination is highly likely to occur. Therefore, the airflow generator 504 is so provided as to generate an airflow that sweeps away a gas in the peripheral region of the recovery unit 8 and flows toward the exhaust port 421 communicating with the circulation system 402 and the exhaust system 430. Even if an abnormality occurs in the recovery unit 8, generation of abrupt apparatus contamination near the recovery unit 8 can be suppressed.

In the embodiment, the airflow generators 501 to 504 have been described by paying attention to a portion where the risk of apparatus contamination arising from the mist (removal target such as the quantum dot material) of the ink 4 is high. However, the positions where the airflow generators 501 to 504 are arranged, and the flows of airflows generated by the airflow generators 501 to 504 are not limited. For example, an airflow flowing from the entire wall surface of the chamber 401 toward the exhaust port 421 communicating with the circulation system 402 and the exhaust system 430 may be generated.

Third Embodiment

Figure 6:
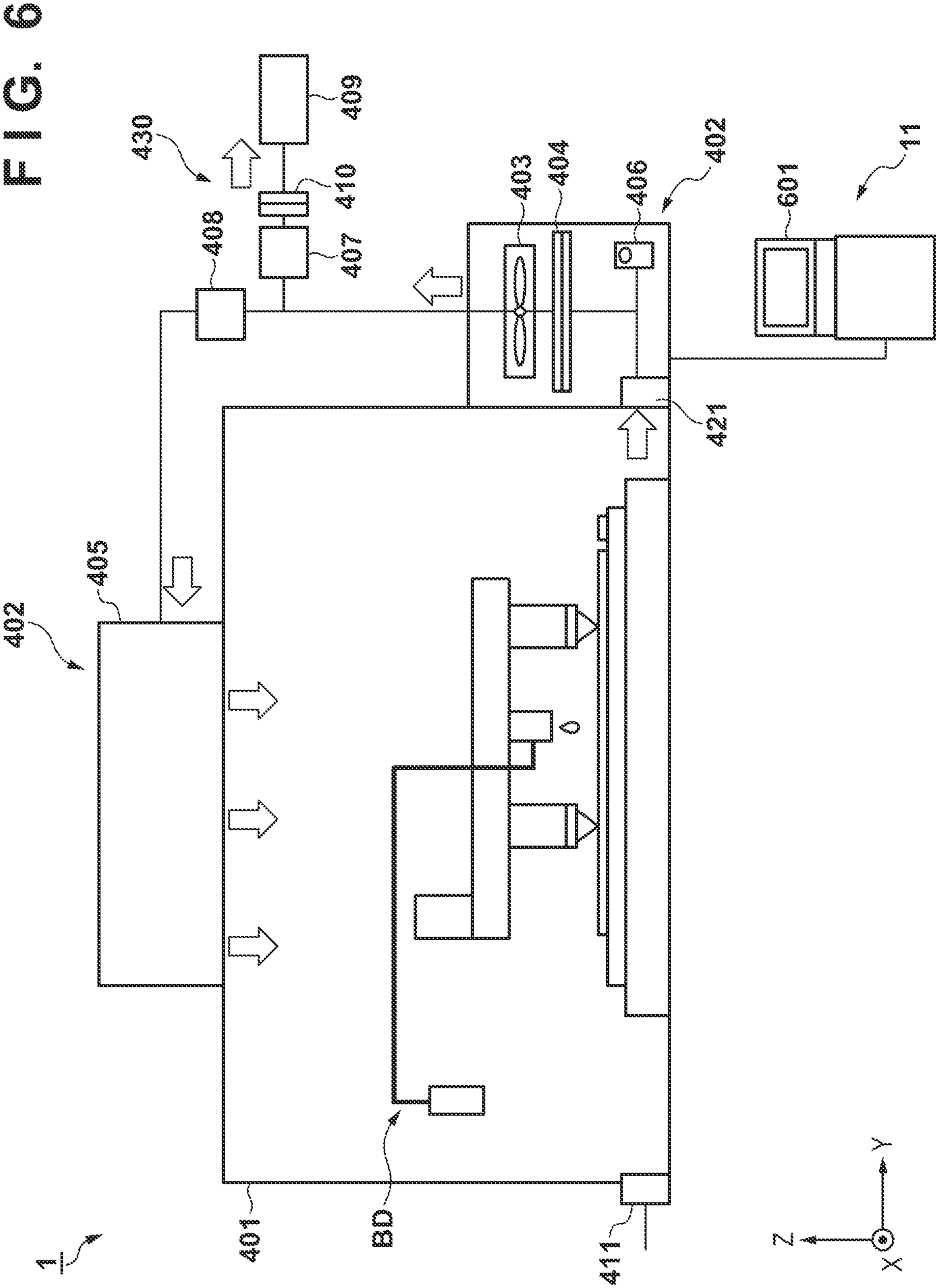
FIG. 6 is a view illustrating configurations of a liquid discharge apparatus according to a third embodiment.

FIG. 6 is a view illustrating configurations of a liquid discharge apparatus 1 according to a third embodiment. In the embodiment, the liquid discharge apparatus 1 includes an interface 601, as shown in FIG. 6. The interface 601 is a user interface that includes a display device, an input device, and the like, and is configured to transmit information or an instruction from the liquid discharge apparatus 1 to a user or from the user to the liquid discharge apparatus 1. The interface 601 is provided in a controller 11 to centralize the functions of the liquid discharge apparatus 1 as a centralized control apparatus, including an overall operation. The interface 601 enables manually starting and stopping the exhaust operation of an exhaust system 430, and forcibly operates the exhaust system 430 in accordance with an instruction from the user regardless of the concentration of an organic component (detection target) detected by a detection unit 406.

Since the exhaust system 430 can be forcibly operated regardless of the concentration of the organic component detected by the detection unit 406, the inside of the apparatus (inside of a chamber 401) can be cleaned at an arbitrary timing. For example, when the user needs to enter the apparatus for apparatus maintenance, trouble recovery, or the like, the exhaust system 430 can be forcibly operated to guarantee the safety in the apparatus before the user enters the apparatus.

Fourth Embodiment

Figure 7:
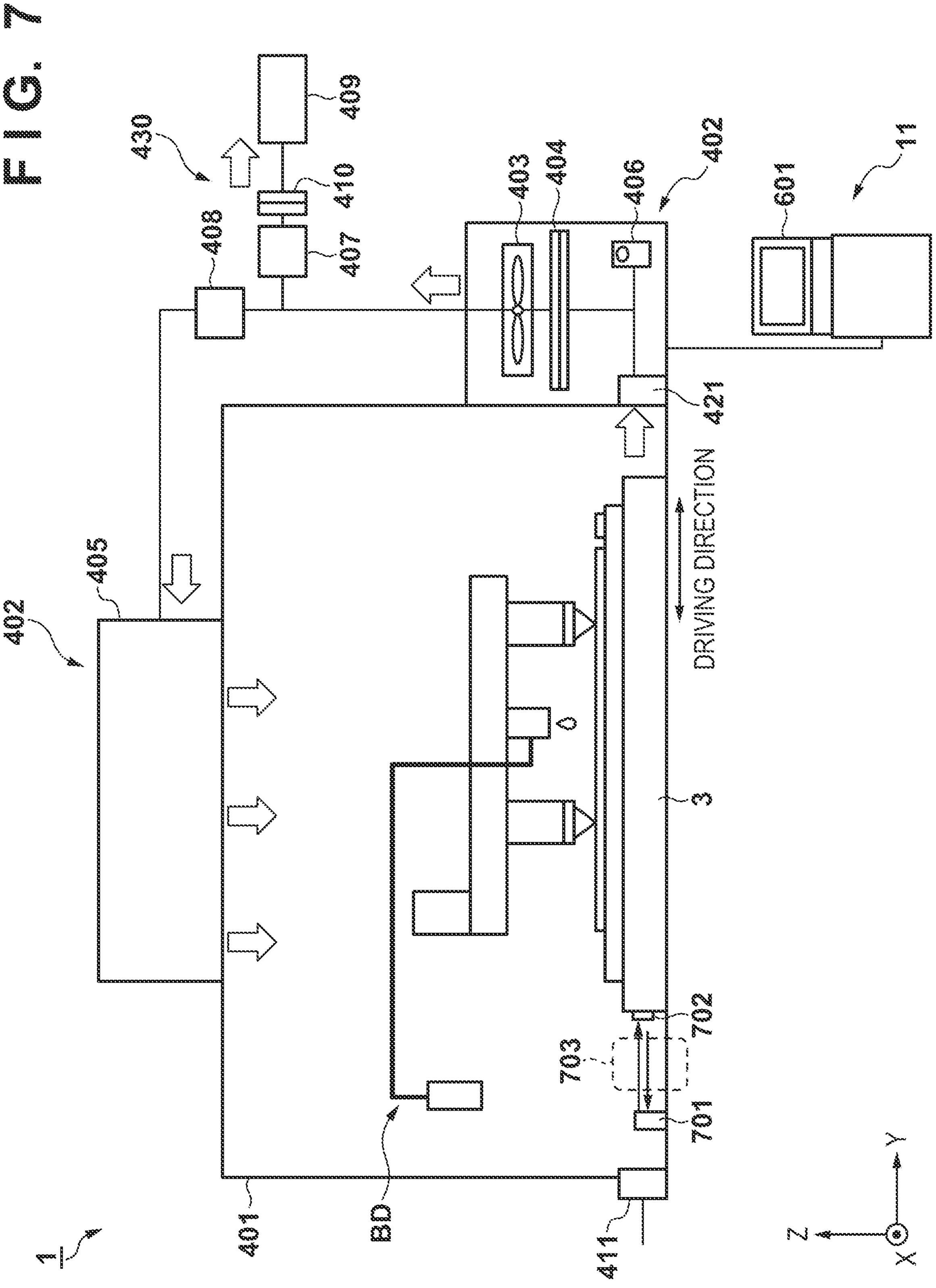
FIG. 7 is a view illustrating configurations of a liquid discharge apparatus according to a fourth embodiment.

FIG. 7 is a view illustrating configurations of a liquid discharge apparatus 1 according to a fourth embodiment. As shown in FIG. 7, the liquid discharge apparatus 1 includes an interferometer 701 that generally measures the position of a substrate stage 3 in real time. The interferometer 701 emits light toward a reflecting member 702 provided on the substrate stage 3, detects the light (reflected light) reflected by the reflecting member 702, and can obtain the position (current position) of the substrate stage 3 from the phase difference at high precision.

Since the interferometer 701 detects the phase difference of light reflected by the reflecting member 702, it is preferable to prevent the mist or organic gas (organic component) of an ink 4 containing a removal target such as a quantum dot material from staying in an optical path region (space) 703 of the interferometer 701. This is because, if the mist or organic gas of the ink 4 stays in the optical path region 703, the refractive index in the optical path region 703 changes and the measurement precision of the position of the substrate stage 3 by the interferometer 701 decreases.

In the liquid discharge apparatus 1, the concentration of the organic component contained in a gas inside a chamber 401 is always detected by a detection unit 406. Therefore, the concentration of the organic component in the optical path region 703 of the interferometer 701 can be estimated. In the embodiment, for example, a controller 11 has the function of a correction unit that corrects the position of the substrate stage 3 measured by the interferometer 701 based on the concentration of the organic component detected by the detection unit 406. More specifically, the change amount of the position of the substrate stage 3 measured by the interferometer 701, which corresponds to the concentration of the organic component detected by the detection unit 406, is estimated, and the position of the substrate stage 3 measured by the interferometer 701 is corrected using the change amount. The position control of the substrate stage 3 can be performed at high precision. Note that it is preferable to obtain in advance the relationship between the concentration of the organic component detected by the detection unit 406 and the change amount of the position of the substrate stage 3 measured by the interferometer 701, and store it as a correction table in (the memory of) the controller 11.

Fifth Embodiment

In the fifth embodiment, before the concentration of an organic component detected by a detection unit 406 becomes equal to or higher than a threshold at which an exhaust system 430 is operated, a rise of the concentration of the organic component contained in a gas inside a chamber 401 is detected to suppress apparatus contamination arising from a removal target such as a quantum dot material. For example, a controller 11 controls a circulation system 402 to increase the flow rate of a gas circulated by the circulation system 402 as the concentration of the organic component detected by the detection unit 406 increases. More specifically, the flow rate of the gas circulated by the circulation system 402 is increased by increasing the air volume of a blower 403. This can increase the flow rate of the gas passing through a filter 404 per hour, and increase the removal amount of the removal target such as the quantum dot material by the filter 404. Accordingly, the speed at which a mist containing the removal target such as the quantum dot material fills the inside the chamber 401 can be suppressed, and apparatus contamination arising from the removal target such as the quantum dot material can be suppressed.

The concentration of the organic component serving as the criterion for increasing the flow rate of the gas circulated by the circulation system 402 can be set arbitrarily as long as it takes a value smaller than the threshold at which the exhaust system 430 is operated. The flow rate of the gas circulated by the circulation system 402 may be increased stepwise in accordance with the concentration of the organic component detected by the detection unit 406, or may be increased when the change amount of the concentration of the organic component per hour reaches a predetermined value or more.

As described in the fourth embodiment, if the apparatus contamination progresses and the mist or organic gas of an ink 4 stays in an optical path region 703 of an interferometer 701, a measurement error is generated in the interferometer 701 that measures the position of a substrate stage 3. However, the effect of suppressing the measurement error of the interferometer 701 caused by the above-mentioned factor can be obtained by increasing the flow rate of the gas circulated by the circulation system 402 as the concentration of the organic component detected by the detection unit 406 increases, as in the embodiment.

Sixth Embodiment

Figure 8:
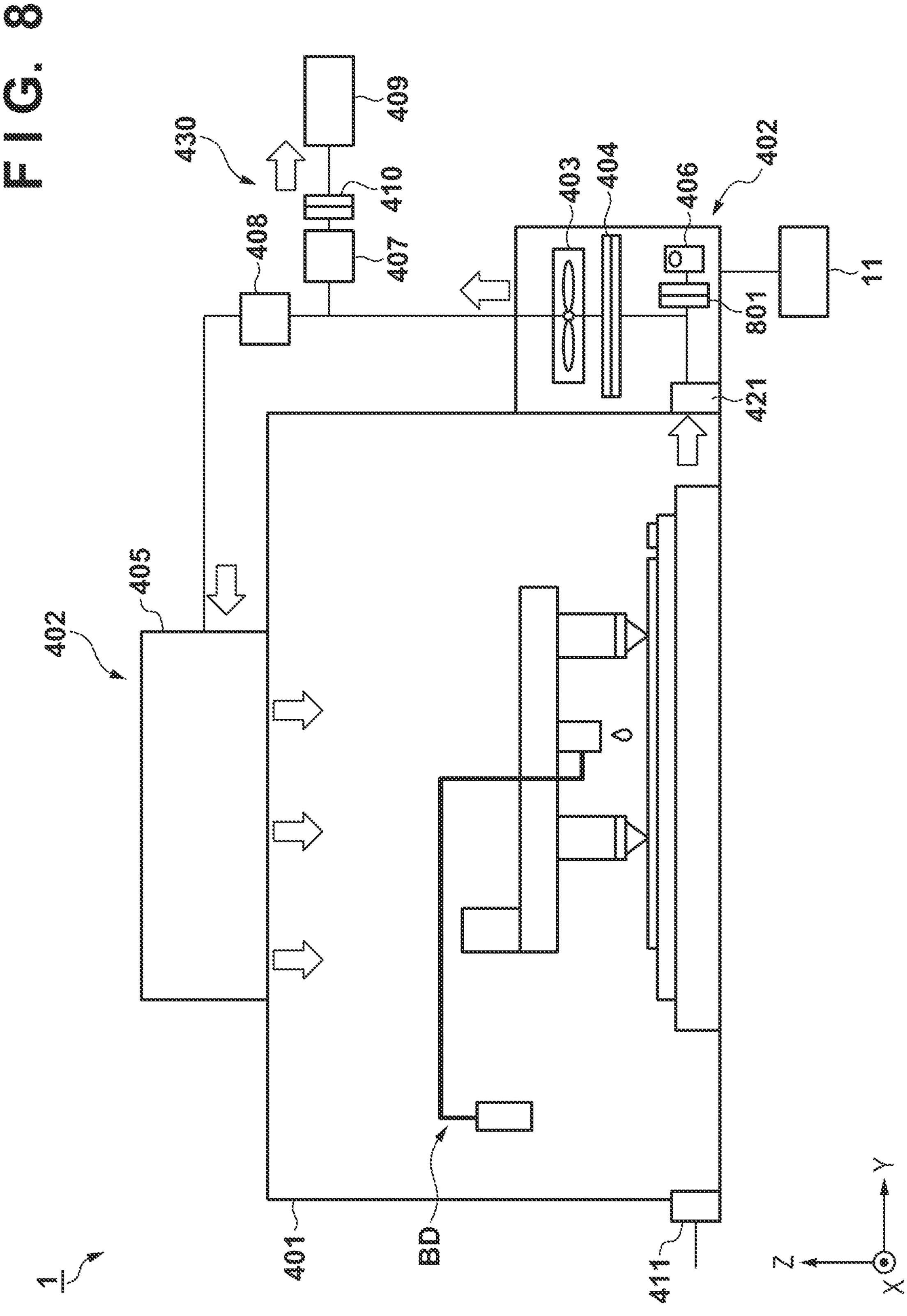
FIG. 8 is a view illustrating configurations of a liquid discharge apparatus according to a sixth embodiment.

FIG. 8 is a view illustrating configurations of a liquid discharge apparatus 1 according to a sixth embodiment. In the embodiment, as shown in FIG. 8, the liquid discharge apparatus 1 includes a filter 801 provided on the preceding stage of a detection unit 406 on the flow path of a gas circulated by a circulation system 402. The filter 801 has a function of removing the mist of an ink 4, particularly, a removal target, similar to filters 404 and 410.

In the liquid discharge apparatus 1, the detection unit 406 that detects the concentration of an organic component requires periodic calibration or maintenance. However, from the viewpoint of ensuring the safety of a user (worker), it is difficult to periodically calibrate or maintain the detection unit 406 contaminated with a removal target such as a quantum dot material. Thus, the filter 801 is preferably provided on the preceding stage of the detection unit 406 to suppress the contamination of the detection unit 406 with the removal target such as the quantum dot material. Note that the new filter 801 is provided on the preceding stage of the detection unit 406 in the embodiment. However, instead of providing the new filter 801, the filter 404 provided in the circulation system 402 may be arranged on the preceding stage of the detection unit 406.

Seventh Embodiment

Figure 9:
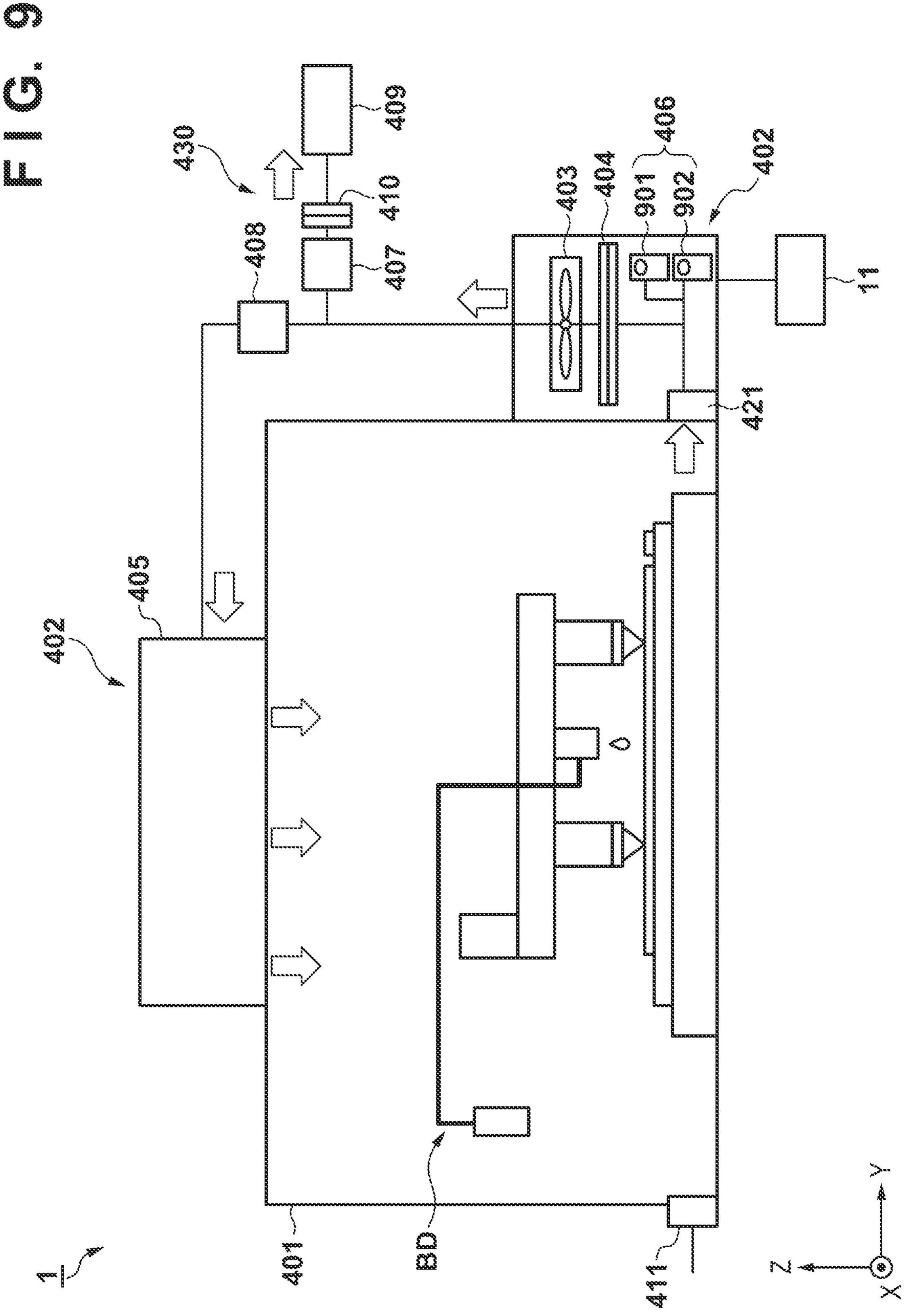
FIG. 9 is a view illustrating configurations of a liquid discharge apparatus according to a seventh embodiment.

FIG. 9 is a view illustrating configurations of a liquid discharge apparatus 1 according to a seventh embodiment. In the embodiment, the liquid discharge apparatus 1 includes, as a detection unit 406, two detectors, that is, a first detector 901 and a second detector 902 that detect an organic component at the same portion inside a chamber 401. The first detector 901 and the second detector 902 detect the organic component at the first portion (arbitrary portion) inside the chamber 401.

In the embodiment, whether the concentration of the organic component is accurately detected can be monitored (mutually monitored) using the first detector 901 and the second detector 902. For example, when the concentration of the organic component detected by the first detector 901 and that of the organic component detected by the second detector 902 differ from each other, it is considered that an abnormality (trouble) is highly likely to occur in the first detector 901 or the second detector 902. In such a case, an exhaust system 430 can be forcibly operated to suppress apparatus contamination arising from a removal target such as a quantum dot material.

Eighth Embodiment

In the embodiment, a circulation system 402 and an exhaust system 430 are operated so that the flow velocity of an airflow generated inside a chamber 401 becomes equal to or lower than 1 m/sec. More specifically, the circulation system 402 is controlled so that the flow velocity (flow velocity of a gas circulated by the circulation system 402) of a gas returned from the circulation system 402 to the inside of the chamber 401 becomes equal to or lower than 1 m/sec. Also, the exhaust system 430 is controlled so that the flow velocity of a gas discharged to exhaust equipment 409 (outside of the chamber 401) by the exhaust system 430 becomes equal to or lower than 1 m/sec.

Since the inside of the chamber 401 is an airtight space unless the exhaust system 430 operates, the gas is circulated inside the chamber 401. If the removal performance of a filter 404 drops owing to age deterioration, an abnormality, or the like, and the concentration of an organic component (of the gas) inside the chamber 401 rises, combustion or explosion may be caused by static electricity generated by motors of respective units or an airflow inside the chamber 401.

To prevent this, according to the embodiment, when the concentration of the organic component detected by a detection unit 406 reaches a predetermined concentration or more, the operation of the liquid discharge apparatus 1 is stopped and the exhaust system 430 is operated. At this time, to suppress the generation of static electricity by an airflow inside the chamber 401, the circulation system 402 and the exhaust system 430 are operated so that the flow velocity of an airflow generated inside the chamber 401 becomes equal to or lower than 1 m/sec. Note that the flow velocity of an airflow generated inside the chamber 401 is adjusted to be equal to or lower than 1 m/sec because, when conveying a combustible fluid, a flow velocity at which generation of static electricity is suppressed and the combustible fluid can be safely conveyed is 1 m/sec.

Ninth Embodiment

In the embodiment, when the concentration of an organic component detected by a detection unit 406 reaches a predetermined concentration or more, the operation of a liquid discharge apparatus 1 except a circulation system 402 and an exhaust system 430 is stopped. For example, the predetermined concentration is set to be equal to or lower than a concentration of the organic component inside a chamber 401 at which combustion or explosion may occur. Alternatively, the predetermined concentration may be set to be equal to or lower than a concentration of the organic component at which the measurement error of an interferometer 701 arising from the mist or organic gas of an ink 4 can fall within an allowable range. Similar to the eighth embodiment, it is preferable to stop the operation of the liquid discharge apparatus 1 and operate the exhaust system 430.

10th Embodiment

An article manufacturing method according to an embodiment of the present invention is suitable for manufacturing an article, for example, a display panel such as an organic EL, a microdevice such as a semiconductor device, or an element having a fine structure. The article manufacturing method according to the embodiment includes a process of forming a liquid film by discharging a liquid to a substrate using (a substrate processing apparatus including) a liquid discharge apparatus 1, and a process of processing, more specifically, drying the substrate having the liquid film formed in the preceding process, thereby obtaining the substrate having the dried film. The article manufacturing method according to the embodiment further includes a process of manufacturing an article from the substrate having the dried film. The article manufacturing method also includes other known processes (for example, baking, cooling, cleaning, oxidation, deposition, vapor deposition, doping, planarization, etching, resist removal, dicing, bonding, and packaging). The article manufacturing method according to the embodiment is advantageous in at least one of the performance, quality, productivity, and production cost of the article, as compared to conventional methods.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent application No. 2022-153999 filed on Sep. 27, 2022, which is hereby incorporated by reference herein in its entirety.

What is claimed is:

1. A liquid discharge apparatus comprising:
a head configured to discharge a liquid;
a chamber configured to contain the head;
a circulation system configured to circulate a gas inside the chamber;
an exhaust system configured to operate to exhaust the gas to an outside of the chamber;
a filter provided in the circulation system and configured to remove a removal target contained in the gas;
a detection unit configured to indirectly detect the removal target by detecting a detection target that is contained in the gas and different from the removal target; and
a controller configured to operate the exhaust system when a concentration of the detection target detected by the detection unit is not lower than a threshold.

2. The apparatus according to claim 1, wherein when the liquid is discharged from the head, the removal target and the detection target scatter from the liquid inside the chamber.

3. The apparatus according to claim 1, further comprising an air supply system configured to operate to suck a gas outside the chamber to an inside of the chamber via an air supply port,
wherein the exhaust system operates to exhaust the gas inside the chamber to the outside of the chamber via an exhaust port, and
the air supply system forms, by the gas sucked into the chamber via the air supply port, an airflow that sweeps away the gas inside the chamber toward the exhaust port.

4. The apparatus according to claim 3, wherein the controller operates the exhaust system and the air supply system to equalize a flow rate of the gas exhausted to the outside of the chamber by the exhaust system and a flow rate of the gas sucked into the chamber by the air supply system.

5. The apparatus according to claim 3, wherein the air supply system includes a plurality of nozzles configured to blow out, to the inside of the chamber, the gas sucked via the air supply port, and
each of the plurality of nozzles forms an airflow that sweeps away the gas inside the chamber toward the exhaust port by the gas blown out to the inside of the chamber.

6. The apparatus according to claim 1, wherein the controller includes an interface configured to operate the exhaust system regardless of the concentration of the detection target detected by the detection unit.

7. The apparatus according to claim 1, further comprising:
a stage configured to hold a substrate on which the liquid discharged from the head is arranged;
an interferometer configured to measure a position of the stage; and
a correction unit configured to correct the position of the stage measured by the interferometer based on the concentration of the detection target detected by the detection unit.

8. The apparatus according to claim 7, wherein the correction unit estimates a change amount of the position of the stage measured by the interferometer that corresponds to the concentration of the detection target detected by the detection unit, and corrects the position of the stage measured by the interferometer using the change amount.

9. The apparatus according to claim 1, wherein the controller controls the circulation system to increase a flow rate of the gas circulated by the circulation system as the concentration of the detection target detected by the detection unit increases.

10. The apparatus according to claim 1, wherein the filter is provided on a preceding stage of the detection unit on a flow path of the gas circulated by the circulation system.

11. The apparatus according to claim 1, wherein the detection unit includes a first detector configured to detect the detection target at a first portion inside the chamber, and a second detector configured to detect the detection target at the first portion, and
the detection unit monitors, by using the first detector and the second detector, whether the concentration of the detection target is correctly detected.

12. The apparatus according to claim 11, wherein when a concentration of the detection target detected by the first detector and a concentration of the detection target detected by the second detector are different from each other, the controller operates the exhaust system.

13. The apparatus according to claim 1, wherein the controller operates the exhaust system to adjust a flow velocity of the gas exhausted to the outside of the chamber by the exhaust system to be not higher than 1 m/sec.

14. The apparatus according to claim 13, wherein the controller controls the circulation system to adjust a flow velocity of the gas circulated by the circulation system to be not higher than 1 m/sec.

15. The apparatus according to claim 1, wherein when the concentration of the detection target detected by the detection unit becomes not lower than a predetermined concentration, the controller stops an operation of the liquid discharge apparatus excluding the circulation system and the exhaust system.

16. The apparatus according to claim 1, wherein the detection target includes an organic component contained in the liquid, and
the removal target includes a quantum dot material contained in the liquid.

17. The apparatus according to claim 16, wherein the quantum dot material includes a heavy metal substance.

18. The apparatus according to claim 16, wherein the quantum dot material includes one of cadmium, indium, and lead.

19. A liquid discharge apparatus comprising:

a head configured to discharge a liquid;

a chamber configured to contain the head;

a circulation system configured to circulate a gas inside the chamber;

a filter provided in the circulation system and configured to remove a removal target contained in the gas; and a detection unit configured to indirectly detect the removal target by detecting a detection target that is contained in the gas and different from the removal target.

20. The apparatus according to claim 19, wherein the detection target includes an organic component contained in the liquid, and the removal target includes a quantum dot material contained in the liquid.

21. A substrate processing apparatus that processes a substrate, comprising:

a stage configured to hold the substrate; and a liquid discharge apparatus configured to discharge a liquid to the substrate held by the stage, wherein the liquid discharge apparatus includes a head configured to discharge the liquid;

a chamber configured to contain the head;

a circulation system configured to circulate a gas inside the chamber;

an exhaust system configured to operate to exhaust the gas to an outside of the chamber;

a filter provided in the circulation system and configured to remove a removal target contained in the gas;

a detection unit configured to indirectly detect the removal target by detecting a detection target that is contained in the gas and different from the removal target; and a controller configured to operate the exhaust system when a concentration of the detection target detected by the detection unit is not lower than a threshold.

22. A substrate processing apparatus that processes a substrate, comprising:

a stage configured to hold the substrate; and a liquid discharge apparatus configured to discharge a liquid to the substrate held by the stage, wherein the liquid discharge apparatus includes a head configured to discharge the liquid;

a chamber configured to contain the head;

a circulation system configured to circulate a gas inside the chamber;

a filter provided in the circulation system and configured to remove a removal target contained in the gas; and a detection unit configured to indirectly detect the removal target by detecting a detection target that is contained in the gas and different from the removal target.

23. An article manufacturing method comprising:

discharging a liquid to a substrate using a substrate processing apparatus;

processing the substrate to which the liquid is discharged; and manufacturing an article from the processed substrate, wherein the substrate processing apparatus processes the substrate and includes, a stage configured to hold the substrate; and a liquid discharge apparatus configured to discharge the liquid to the substrate held by the stage, wherein the liquid discharge apparatus includes a head configured to discharge the liquid;

a chamber configured to contain the head;

a circulation system configured to circulate a gas inside the chamber;

an exhaust system configured to operate to exhaust the gas to an outside of the chamber;

a filter provided in the circulation system and configured to remove a removal target contained in the gas;

a detection unit configured to indirectly detect the removal target by detecting a detection target that is contained in the gas and different from the removal target; and a controller configured to operate the exhaust system when a concentration of the detection target detected by the detection unit is not lower than a threshold.

24. An article manufacturing method comprising:

discharging a liquid to a substrate using a substrate processing apparatus;

processing the substrate to which the liquid is discharged; and manufacturing an article from the processed substrate, wherein the substrate processing apparatus processes the substrate and includes, a stage configured to hold the substrate; and a liquid discharge apparatus configured to discharge a liquid to the substrate held by the stage, wherein the liquid discharge apparatus includes a head configured to discharge the liquid;

a chamber configured to contain the head;

a circulation system configured to circulate a gas inside the chamber;

a filter provided in the circulation system and configured to remove a removal target contained in the gas; and a detection unit configured to indirectly detect the removal target by detecting a detection target that is contained in the gas and different from the removal target.

* * * * *